United States Patent [19]

DeMarthe

[11] Patent Number: 4,954,322

[45] Date of Patent: Sep. 4, 1990

[54] PROCESS FOR THE RECOVERY OF METAL VALUES CONTAINED IN A GANGUE

[75] Inventor: Jean-Michel DeMarthe, Mont Saint Eloi, France

[73] Assignee: Metaleurop S.A., Fontenay Sous Bois, France

[21] Appl. No.: 385,456

[22] Filed: Jul. 27, 1989

[30] Foreign Application Priority Data

Jul. 29, 1988 [FR] France ............................ 88 10304

[51] Int. Cl.$^5$ .................. C01G 15/00; C01G 17/00; C01G 49/14
[52] U.S. Cl. .......................... 423/95; 423/98; 423/128; 423/132; 423/145; 423/146; 423/150
[58] Field of Search .................. 423/95, 98, 128, 132, 423/146, 150, 548, 549, 558; 75/101 R, 115, 121, 108; /

[56] References Cited

U.S. PATENT DOCUMENTS

| | | | |
|---|---|---|---|
| 3,676,106 | 1/1971 | Barnard et al. | 423/95 |
| 3,860,696 | 1/1975 | McGauley et al. | 423/558 |
| 4,163,047 | 7/1979 | Dorr | 423/531 |
| 4,219,354 | 8/1980 | Rastas | 423/146 |

FOREIGN PATENT DOCUMENTS

| | | |
|---|---|---|
| 0132820 | 2/1985 | European Pat. Off. . |
| 0133505 | 2/1985 | European Pat. Off. . |
| 0194544 | 9/1986 | European Pat. Off. . |
| 0267180 | 5/1988 | European Pat. Off. ............... 423/95 |
| 502674 | 7/1930 | Fed. Rep. of Germany . |
| 525307 | 5/1931 | Fed. Rep. of Germany . |
| 1124781 | 3/1962 | Fed. Rep. of Germany . |
| 2618121 | 11/1977 | Fed. Rep. of Germany . |
| 2618122 | 11/1977 | Fed. Rep. of Germany . |
| 1300603 | 12/1962 | France . |
| 2132875 | 11/1972 | France . |
| 2357479 | 2/1978 | France . |
| 656146 | 8/1851 | United Kingdom . |

*Primary Examiner*—Robert L. Stoll
*Attorney, Agent, or Firm*—Fleit, Jacobson, Cohn, Price, Holman & Stern

[57] ABSTRACT

The invention relates to a process for the recovery of metal values contained in a ferric gangue.

The process comprises the following stages:
(a) dissolution of the metal values from the ferric gangue with sulphuric acid;
(b) recovery of the metal value or values by a method which is known per se,
(c) evaporation of the acid ferric solution resulting from stage (b) so as to increase the acidity to a value of between about 50 and 100%,
(d) crystallization from this solution, at a temperature of between −10 and 50° C., of a hydrated iron sulphate of formula $Fe_2(SO_4)_3.9H_2O$.

Application to the recovery of strategic metals.

10 Claims, No Drawings

PROCESS FOR THE RECOVERY OF METAL VALUES CONTAINED IN A GANGUE

The subject of the present invention is the recovery of metal values contained in a ferric gangue.

It relates more particularly to the recovery of values, the ferric matrix of which must be dissolved in order to obtain a good yield.

Very many metal values, and in particular the non-ferrous metals, are imprisoned in gangues or ferric matrices. These gangues and these matrices can either be natural, or originate from the metallurgical process and constitute a by-product or waste of it. Most of the solutions used on the industrial scale are sulphuric solutions.

Once the iron is dissolved it is expedient, in order to equilibrate the balance of the process, to recover it in a solid form, which form must either be saleable, or dischargeable in compliance with the standards which vary according to the country and the environmental laws.

In the very specific case of zinc smelter residues, attack takes place in an acid medium, termed the concentrate, and hot; this process of washing with boiling acid is better known under the Anglo-Saxon acronyn of HSL "Hot Strong Leaching". In the case of zinc smelters, the calcine (ZnO) is an almost-free source of base which allows the excess acid to be neutralized and the base which is indispensable to precipitation of the iron oxides or hydroxides, which will be rejected, to be provided. This rejection of iron oxide is a poorly-controlled problem for two principal reasons; on the one hand the tendency of iron hydroxides and hydrated oxides to entrain with them many metals or chemical species during their precipitation, and on the other hand the high cost of the precipitation of iron oxides "sensu stricto".

This need to precipitate the iron oxides and iron hydroxides has led specialists to avoid the use of the strong acidities which could be thought necessary for easy dissolution of the iron oxides, and has prompted them to use techniques which facilitate dissolution of the iron oxides by chemical displacement, and more particularly by reduction; these techniques have finally shown themselves to be only palliatives.

The problem is particularly acute in the case of non-ferrous metals which are of high added value but are widely disseminated and the grades of which, after an optional concentration, are at most equal to about 1%, in general 0.1%. Among these metals may be mentioned the metals known as either trace metals or strategic metals, that is to say the metals which are constituents of infra-red optical elements, opto-electronic or electronic elements, such as germanium, gallium, indium and the rare earths. In fact, metals of this type, which are to be recovered, are contained at very low concentrations in ours or in certain residues.

As an indication, a concentration of 500 ppm is often considered as a rich source of these trace metals (in the preceding numbers, as in those which follow, the zeros are not significant and are only present because their use is necessary to indicate the order of the values). It is easy to imagine the proportionately enormous quantities of iron which must be manipulated in order to recover a few tonnes of these strategic metals. In addition, the iron present in solution, in particular in its ferric form, is a considerable embarrassment to the recovery of these trace metals, on the one hand because it is a competitor of the trace metals to be recovered, and on the other hand because a certain number of reagents used by hydrometallurgists for such recoveries are often destroyed by the ferric iron because of the oxidizing properties of the latter.

Thus, for example, for certain of these gallium-bearing and germanium-bearing ores, a reduction-leaching technique has been proposed which is carried out in the presence of sulphuric acid and sulphur dioxide, followed by a reduction of the residual iron with metallic iron, further increasing the quantity of iron to be eliminated in a later stage, a precipitation of the germanium according to sulphurating precipitation techniques, a gallium recovery stage using cation exchangers, which is permitted by the low acidity of a non-reducing type, and finally a waste in the form of ferrous iron which is considered by most water authorities to be very harmful since it is capable, by oxidation, of reducing the quantity of oxygen while increasing the acidity of waters into which these wastes may have been entrained.

It is for this reason that one of the objects of the present invention is to provide a process for the recovery of metal values contained in a gangue or in a ferric matrix, which allows recovery of the said metal values without having to neutralize and reduce the whole solution.

Another object of the present invention is to provide a process which allows the iron to be made more valuable, or to be removed in an ecologically acceptable form.

Another object of the present invention is to provide a process which allows removal of the iron without entraining any metal value or impurity.

These objects, and others which will appear later, are attained by means of a process for the recovery of metal value(s) contained in a ferric gangue, characterized in that it comprises the following stages:

(a) dissolution of the metal values from the ferric gangue with sulphuric acid;

(b) recovery of the metal value or values by a method which is known per se, (c) evaporation of the acid ferric solution resulting from stage (b) so as to increase the acidity to a value of between about 50 and 100% so as to take the ferric iron concentration to a value of between approximately 1M and 2M, the said evaporation being followed by an optional stage of addition of concentrated sulphuric acid or oleum to adjust the sulphuric acid concentration to a value greater than about 10N, (d) crystallization from this solution, at a temperature of between $-10°$ and $50°$ C., preferably between $20°$ and $30°$, of a hydrated iron sulphate of formula $Fe_2(SO_4)_3.9H_2O$; the mother liquor solution can be recycled to the attack stage.

Advantageously the sulphuric acid is added in a quantity such that at the end of the reaction the charge corresponding to the protons of the residual acidity is at least equal to about the sum of that of the other cations in solution. This condition allows very good dissolution of the iron. If an incomplete dissolution of the iron is required, it is sufficient to calculate the necessary quantity of acid following this rule, and to stop the reaction prematurely.

Although this technique is particularly satisfactory, there are cases in which it can only be used with caution, or even where in which other techniques must be chosen. One of these cases is that in which the ore or the concentrate contains silica or silicates which, under the action of sulphuric acid, are liable to produce colloidal silica. This is true above all for the germanium-bearing ores, germanium having a tendency to become fixed in the silicate phases since the medium contains colloidal silica.

For reasons which still remain unexplained, the absorption of germanium by colloidal silica can be avoided, or reduced by leaching at acidity levels less than, preferably, 100 g/l, advantageously less than or about 50 g/l of sulphuric acid. This latter constraint is not necessarily in contradiction to the constraint relating to the cation charges; in the case in which it is wished to obtain solutions of relatively low concentration it is sufficient in effect to carry out the addition of acid in such a manner that the concentration of sulphuric acid is close to the limits mentioned above, without ever exceeding them. Techniques of multi-stage counter-current attack lend themselves well to such operations. Discontinuous or semi-continuous operations can also be envisaged in which the attack is carried out in batches and in which the concentration of residual sulphuric acid is maintained in the region of 50 or 100 g/l by frequent or continuous additions of sulphuric acid by means, for example, of a programmable robot.

When, at the same time, a high concentration of ferric iron is required in the final solution, for example in the case in which the ore is low-grade, and when free silica in colloidal form is formed or is already there, and when in addition it is desired to recover germanium from this solution, the constraints of maximum acidity mentioned above become extremely desirable and prevail over all other considerations, in particular when the colloidal silica content after leaching is at least equal to about 1% of the content of the residue.

With the exception of this specific problem of colloidal silica which is concomitant with germanium, it is preferable to use high acidities, that is to say such that at the end of the reaction the charge corresponding to the protons of the residual acidity is at least equal to about the sum of that of the other cations in solution.

In fact, according to the present invention, it has been shown that when working at acidities such as specified above, the duration of attack was very much reduced, which has the considerable advantage of reducing the residence time, with as a corollary a very noticeable reduction in the size of reactors necessary for the attack stage.

This excess seems also to have a very favourable effect on the precipitation of ferric sulphate. For this effect, it is desirable that the excess of acidity aimed at in stage (a) above is not greater than ½, advantageously ⅓ and preferably ¼ of the minimum value.

Advantageously, the residual content of sulphuric acid after attack is at least equal to about 100 g/l, preferably about 200 g/l.

Precipitation of nonahydrated neutral ferric sulphate can occur as early as the end of the evaporation stage (c). This evaporation can be carried out in any known manner, such as, for example, evaporation under vacuum distillation, or even, in climates in which it is possible, evaporation in the open air.

This evaporation can also be carried out so as to use energy-saving techniques such as, for example, the greenhouse effect and single or multi-effect distillation.

The optional sulphuric acid addition stage sometimes refered as C' is carried out by adding concentrated acid which can come either from recycling or from production carried out on the same site as that where the process is implemented, or by using a sulphuric acid which is capable of being transported without difficulty, that is to say a sulphuric acid at greater than 90%. The use of concentrated sulphuric acid or oleum also allows the introduction of only a little water in this stage (c). Stage (d) follows the preceding stage directly, and consists in leaving the temperature to fall in order to facilitate the precipitation of nonahydrated ferric sulphate. Stage (d) is a logical continuation of stage (c), and can be carried rut in the same reactor as the said stage (c).

It is preferred that during the crystallization stage the iron precipitates in majority under the said nonahydrated from, advantageously at least 90%, preferably 95%.

One of the most surprising aspects is that using concentrated sulphuric acid it is possible to precipitate a salt which on the one hand is nonahydrated, which implies an enrichment of the solution in sulphuric acid, and on the other hand to precipitate a neutral salt, that is to say a sulphate and not a bisulphate or hydrogensulphate.

Another particularly useful and surprising aspect of the precipitation stage resides in the fact that this precipitation of nonahydrated sulphate is extremely selective with respect to other elements in solution. It follows that it is possible to recycle the mother liquor solutions to the attack stage, and only to carry out stage (b) of recovery of metal value on a fraction of the circulating material, in other words on a bleed, this stage (b) only constituting a type of purge, the fractional character of which allows the metal value content to be increased to a level at which recovery becomes easier.

Thus, gallium, which has many chemical properties in common with ferric iron, is not entrained to a measurable extent, even at levels equal to a tenth of those of the iron.

This property also allows the recovery stage (b) to take place, as was envisaged above, on a part or purge of the principal flow, this purge being capable of being placed before or after the iron precipitation stage, which allows competition with the principal species dissolved in the medium to be reduced.

For using this selectivity property in good conditions advisable that the concentration in various metals, particularly in the valuable metals are lower than their solubility threshold in the condition of crystallization after evaporation stage, advantageously at most equal to the solubility threshold diminished par 10 g/l or at most equal to 70%, preferably 50% of the solubility threshold.

Precipitation of the abovementioned ferric species is favoured by maintenance of acid conditions, that is to say that advantageously the precipitation takes place in an acidity range which corresponds to an excess of sulphuric acid which is at least equal to 1.5M (or 3N) to 8M, preferably between 3M and 5M.

In order to avoid any difficulty possibly occuring as a consequence of hydrolysis, the above sulfuric solutions preferably did not contain elements such as titanium IV able to be hydrolyzed in the above acidity ranges.

Stage (b) of recovery of the metal values can be carried out as indicated above, that is to say between the dissolution stage (a) and the evaporation stage (c), either after stage (d) or advantageously in numerous cases between stage (c) and (c') (in the case in which the metal values are at concentrations which are far from their solubility threshold), which allows the metal values to be recovered from a solution which is at close to ambient temperature. This has a great advantage for cation exchanges, and in particular for liquid/liquid extractions, which in general cannot be carried out above temperature of 40° to 60° C.

When it is a question of recovering germanium, techniques of extraction by ion exchange in stationary phase or liquid phase are particularly well suited to the resolution of this problem. This recovery stage is preferably carried out on a large fraction of the flow or on the whole flow; it is generally arranged that the concentration of germanium to be extracted is not greater than 1 g/l, and preferably than 500 mg/l.

Reference can be made to Patent Application EP No. 0,046,437 for the technique of recovery of germanium.

While no technique exists which allows the metal value to be extracted at a pH and ferric ion concentration such as that resulting either from stage (a) or from stage (d), it is preferable, by recycling a large part of the solution after the precipitation (d), to allow the contents of metal value to increase and to implement a bleed which will be as low as possible, and will depend on the enrichment factor of the solution with respect to the value which it would have it there had not been any recycling, and to treat this bleed so as to adjust the pH and the ferric ion concentration in such a way as to allow extraction or recovery of the dissolved metals.

For the recovery of metals such as indium and gallium it is possible to use fat-soluble hydrophobic acids derived from phosphorus of the phosphoric acid ester, mono- or di-ester, phosphoric poly-acid ester such as the alkyl pyrophosphates (for example dioctyl pyrophosphate, which is known under the Anglo-Saxon acronym of OPPA) type, but the phosphonic and phosphinic acids and esters are also particularly well suited; the acids with two phosphorus atoms separated by a carbon atom are particularly attractive, such as, for example, those of the hydroxydiphosphonic acids.

As an indication, it can also be stated that under the process conditions functional groups of the amine type do not hinder extraction of such metal values, and that commercially available resins containing an aminophosphonic groups are thus perfectly suitable for this type of recovery of trace metals.

The processes which are described in patent application EP-A-0,008,992 and in European patent application No. 0,046,437 can be mentioned as processes capable of giving good results.

Purging of the noble metals can be carried out on a fraction of the flow by metallic or sulphating cementation. For silver, for example, the techniques described in the French patent application which was filed under the No. 83 19825 and published under the No. 2,556,369 can be used.

As to the temperatures and pressures at which the different stages are carried out, the pressure is in general atmospheric, except when arranged otherwise. As far as is possible, it is preferable to carry out the attack operations at about boiling point, that is to say in general between 80° and 110° C. Attack can also be carried out at a higher temperature under the corresponding pressure. Temperatures also play a role in liquid/liquid extraction, cementations and all the implementations.

The process according to the present invention can be completed by a stage (e) of transformation of the nonahydrated ferric sulphate to iron oxide or hydroxide according to techniques which are known per se; for example hematite could be precipitated and sulphuric acid regenerated by using an autoclave.

The following non-limiting examples will allow those skilled in the art better to understand the invention and its technical and economic significance.

Example 1

An ore containing germanium and gallium and having the following composition: germanium 880 g/t, gallium 360 g/t, iron 18.5%, silicon 25.7%, arsenic 0.9%, molybdenum 300 g/t, copper 0.6%, dolomite 8%, titanium 0.067%, antimony 330 g/t and zinc 0.8% is put in contact with various sulphuric acid solutions, the residence time being 6 hours, the temperature 95° C. and the pulp content 200 g/l.

For calculation of the cation species in solution, it was considered that, in the pH ranges chosen, only the thermodynamically stable species existed, that is to say that molybdenum is not ionized, arsenic, which should be in its 5 form, is not ionized either, germanium is reputed to carry two positive charges and gallium three charges, antimony is also reputed to be neutral. The other cations are reputed to be at their normal charge in the medium, not taking account of possible complexes with sulphate or hydrogensulphate species or even sulphuric acid. Dissolution of titanium and calcium can be considered as negligible; on the other hand the whole of the magnesium from the dolomite is rapidly dissolved, as well as the copper and the zinc.

The easily and rapidly soluble compounds represent, for the ore sample under consideration, about 300 milliequivalents per litre. The compounds which play a neutralizing role, absorbing the acid and remaining insoluble (calcium carbonate) represent about 200 milliequivalents per litre.

Thus, taking account of the 18.5% iron content of the ore, according to the preferential rule of the invention for obtaining a good total leaching of the iron a residual acidity of about 2.5 gram equivalents would be necessary. This is in fact what is shown in Table I below:

| Experiment No. | Initial $H^{+*}$ ($H_2SO_4$ g/l) | Final $H^{+*}$ | $M^{n+}$ in solution* | Yield of iron with respect to the liquid % |
|---|---|---|---|---|
| Experiment 1 | 3.3 N (162 g/l) | 1.5 N | 1.65 N | 66 |
| Experiment 2 | 4.3 N (211 g/l) | 2.15 N | 1.96 N | 82 |
| Experiment 3 | 5.2 N (255 g/l) | 2.78 N | 2.26 N | 97 |
| Experiment 4 | 6.1 N (299 g/l) | 3.58 N | 2.32 N | 100 |

*expressed in gram equivalents per liter.

The kinetics aspect is equally eloquent: solution kinetics (Table II below)

| Final (H$_2$SO$_4$) in g/l | Ge in mg/l | | | | Ga in mg/l | | | | Fe in g/l | | | |
|---|---|---|---|---|---|---|---|---|---|---|---|---|
| | 1 h | 2 h | 4 h | 6 h | 1 h | 2 h | 4 h | 6 h | 1 h | 2 h | 4 h | 6 h |
| Experiment 1 | 43 | 58 | 80 | 96 | 26 | 32 | 42 | 48 | 12.2 | 15.8 | 21.6 | 24.6 |
| Experiment 2 | 57 | 76 | 104 | 122 | 34 | 43 | 51 | 57 | 16.2 | 21 | 27.6 | 30.6 |
| Experiment 3 | 92 | 113 | 131 | 141 | 45 | 53 | 60 | 61 | 24.4 | 29.6 | 33.4 | 36 |
| Experiment 4 | 99 | 121 | 136 | 147 | 50 | 56 | 64 | 66 | 26.8 | 32.2 | 37 | 37.2 |

Example 2:

Experiment on the extraction of germanium from an aqueous phase solution as obtained in the preceding examples.

The aqueous phase is an average solution of the filtrates from the various attacks carried out. It was filtered so as to remove the crystallized gypsum. Composition:

| Ge = | 130 mg/l | Cu = | 1.14 g/l |
|---|---|---|---|
| As = | 1.48 g/l | Fe = | 36.3 g/l |
| Mo = | 26 mg/l | H$_2$SO$_4$ = | 200 g/l |

The partition curves at ambient temperature were determined on the average attack solution, which had not undergone any preliminary treatment, under the following operating conditions:
variable O/A: 1, ½, 1/5, 1/10, 1/25;
contact time = 15 min;
ambient temperature.

The results, which allow partition curves to be drawn if necessary, are collated in Table III following:

The molybdenum is extracted at the same time as the germanium, but with a very much greater partition coefficient: $K_{D(Mo)} = 600$, $K_{D(Ge)} = 21$.

Three extraction stages are needed to deplete the aqueous phase from 130 to 5 mg/l of germanium, working with an O/A of 1/5; under these conditions the organic phase contains 625 mg/l of germanium.

Taking account of the values found in the organic phase, arsenic is extracted sparingly or not at all under the conditions studied.

The turbidity observed in the aqueous phase is due to the presence of organic phase (after 2 hours the aqueous phase becomes clear, and the presence of organic phase on the surface is observed). Flocculation of the silica before solvent extraction is indispensable.

Example 3

Example of the selectivity of the precipitation of iron with respect to gallium

Gallium is here taken as a paradigm of impurities of a trivalent character, which risk being entrained by the iron on precipitation. 150 ml samples of a 500 g/l sulphuric acid solution in which variable quantities of

| | Ge | | Mo | | As | |
|---|---|---|---|---|---|---|
| | APh | OPh mg/l | APh | OPh mg/l | APh | OPh mg/l |
| Aqueous solution | 130 mg/l | | 26.0 mg/l | | 1.48 g/l | |
| O/A = 1 | 7.5 mg/l | 123 | 1.3 mg/l | 25 | 1.47 g/l | 10 mg/l |
| O/A = 1/2 | 8.5 mg/l | 243 | " | 49 | 1.44 g/l | 80 mg/l |
| O/A = 1/5 | 34 mg/l | 480 | " | 124 | 1.45 g/l | 150 mg/l |
| O/A = 1/10 | 59 mg/l | 710 | 1.2 mg/l | 247 | 1.45 g/l | 300 mg/l |
| O/A = 1/25 | 94 mg/l | 900 | 1.2 mg/l | 618 | 1.46 g/l | 500 mg/l |

APh = aqueous phase;
OPh = organic phase

The results for the organic phase are obtained by calculation from the values in the aqueous phase. Verification experiments confirm the suitability of this approach.

For phase ratios 1 and ½ no settling is possible; the aqueous phase and the organic phase form an emulsion. For the other phase ratios settling is observed between the organic phase and the aqueous phase, but the aqueous phase remains turbid and the presence of large amounts of scum is noted between the organic phase and the aqueous phase.

An experiment carried out at 40° C. without treatment of the aqueous phase does not improve settling.

After flocculation of the silica (polyox B at 1 g/l, quantity added: 1% by volume; contact time = 2 hours at ambient temperature), the presence of scum is no longer observed but the aqueous phase remains turbid (the turbidity is less at 40° C. than at ambient).

gallium (from 0.5 to 5 g/l) have been dissolved, and in which ferric sulphate has been dissolved at a rate of about 100 g/l of ferric iron, were made up. On leaving the solution to cool slowly, a precipitate of nonahydrated ferric sulphate and a supernatant solution are obtained. The gallium concentration in the supernatant solution is determined, and the quantity of gallium entrained in the precipitate, as well as the precipitation yield, are calculated. No measurement could demonstrate entrainment of gallium in the precipitate, the results obtained being situated either side of the initial level, and close to the measurement uncertainties.

X-ray studies carried out on the ferric sulphate precipitate show that at least 90% of the iron precipitated is in the form of a nonahydrated ferric sulphate of formula $Fe_2(SO_4)_3 \cdot 9H_2O$. In a surprising manner, the other ferric species are hydroxylated species, which puts them in the category of hydroxysulphates.

In addition, the iron precipitation yield increases very slightly, probably through the common-ion effect. It increases from 67.6% for 0.5 g/l of gallium in solution in the form of sulphate, to 69.2% for 5 g/l. This last variation is not, however, very significant.

I claim:

1. Process for recovery of metal values contained in a ferric gangue, characterized in that it comprises the following stages:
   (a) dissolution of the metal values from the ferric gangue with sulphuric acid;
   (b) recovery of the metal values,
   (c) evaporation of the acid ferric solution resulting from stage (b) so as to increase the acidity to a value of between about 50 and 100% so as to take the ferric iron concentration to a value of between approximately 1M and 2M,
   (d) crystallization from this solution, at a temperature of between $-10°$ and $50°$ C., of a hydrated iron sulphate of formula $Fe_2(SO_4)_3.9H_2O$.

2. Process according to claim 1, characterized in that it comprises in addition the following stage:
   (e) hydrolysis of the ferric sulphate under pressure to give hematite and sulphuric acid.

3. Process according to claim 1, characterized in that the acidity at the end of stage (a) is greater than that corresponding to 100 g of sulphuric acid.

4. Process according to claim 1, characterized in that the ferric gangue contains germanium as a metal value, and that stage (b) consists of an exchange of ions with a reagent chosen from the group comprising the derivatives of 8-hydroxyquinoline and the diphosphonic acids.

5. Process according to claim 1, characterized in that stage (b) comprises the purge of a fraction of the circulating liquid and an extraction of gallium as the metal value.

6. Process according to claim 1, characterized in that during stage (a) sulphuric acid is added in such a quantity that at the end of the reaction the charge corresponding to the protons of the residual acidity is at least equal to the sum of the charge of the metal values cations.

7. Process for the recovery of metal values contained in a ferric gangue, characterized in that it comprises the following stages:
   (a) dissolution of the metal values from the ferric gangue with sulphuric acid,
   (b) recovery of the metal values,
   (c) evaporation of the acid ferric solution resulting from stage (b) so as to increase the acidity to a value of between about 50 and 100% so as to take the ferric iron concentration to a value of between approximately 1M and 2M, the said evaporation being followed by a stage of addition of concentrated sulphuric acid or oleum to adjust the sulphuric acid concentration to a value greater than about 10N,
   (d) crystallization from this solution, at a temperature of between $-10°$ and $50°$ C., of a hydrated iron sulphate of formula $Fe_2(SO_4)_3.9H_2O$.

8. Process according to claims 1 and 7, characterized in that crystallization temperature in stage (d) is between $20°$ and $30°$ C.

9. Process according to claims 1 and 7 characterized in that the mother liquor solution from stage (d) is recycled to the attack stage.

10. Process according to claim 3, characterized in that the acidity at the end of the stage (a) is greater than that corresponding to 200 g of sulphuric acid.

* * * * *